(12) United States Patent
George, II et al.

(10) Patent No.: US 12,258,524 B2
(45) Date of Patent: *Mar. 25, 2025

(54) FUEL PROCESSING SYSTEM AND METHOD FOR SULFUR BEARING FUELS

(71) Applicant: Battelle Memorial Institute, Columbus, OH (US)

(72) Inventors: Paul E. George, II, Powell, OH (US); Vincent J. Contini, Powell, OH (US); Greg A. Whyatt, West Richland, WA (US); Douglas A. Thornton, Columbus, OH (US)

(73) Assignee: BATTELLE MEMORIAL INSTITUTE, Columbus, OH (US)

( * ) Notice: Subject to any disclaimer, the term of this patent is extended or adjusted under 35 U.S.C. 154(b) by 214 days.

This patent is subject to a terminal disclaimer.

(21) Appl. No.: 17/164,276

(22) Filed: Feb. 1, 2021

(65) Prior Publication Data

US 2021/0155859 A1 May 27, 2021

Related U.S. Application Data

(63) Continuation of application No. 16/284,077, filed on Feb. 25, 2019, now Pat. No. 10,941,359, which is a
(Continued)

(51) Int. Cl.
*C10G 67/06* (2006.01)
*B01J 8/04* (2006.01)
(Continued)

(52) U.S. Cl.
CPC ............... *C10G 67/06* (2013.01); *B01J 8/04* (2013.01); *B01J 8/0496* (2013.01); *C01B 3/34* (2013.01);
(Continued)

(58) Field of Classification Search
None
See application file for complete search history.

(56) References Cited

U.S. PATENT DOCUMENTS 3,442,632 A * 5/1969 Mayland ................ C10G 11/22
48/211
3,476,534 A  11/1969 Buswell et al.
(Continued)

FOREIGN PATENT DOCUMENTS

GB          1398078 A       6/1975
JP       2002/356308 A     12/2002
WO     WO 2009/123585 A1  10/2009

OTHER PUBLICATIONS

Carroll, John J., Natural Gas Hydrates: A Guide for Engineers, Second Edition, 2009, pp. 255-259, Year 2009.

*Primary Examiner* — Jennifer A Leung
(74) *Attorney, Agent, or Firm* — Lippes Mathias LLP

(57) ABSTRACT

A fuel processing system and method for a sulfur bearing fuel include a hydrodesulfurization reactor followed by an adsorbent bed for removing sulfur or sulfur containing species from the fuel. In certain embodiments, the adsorbent bed is a ZnO bed. In another embodiment, a fuel processing system and method for a sulfur bearing fuel include a steam reformer, a hydrodesulfurization reactor, and an adsorbent bed.

18 Claims, 6 Drawing Sheets

Related U.S. Application Data continuation of application No. 13/272,865, filed on Oct. 13, 2011, now abandoned.

(60) Provisional application No. 61/392,698, filed on Oct. 13, 2010.

(51) Int. Cl.
*C01B 3/34* (2006.01)
*C01B 3/48* (2006.01)
*C01B 3/50* (2006.01)
*C10G 25/00* (2006.01)
*C10G 45/02* (2006.01)
*C10G 49/00* (2006.01)
*H01M 8/0612* (2016.01)
*H01M 8/0662* (2016.01)

(52) U.S. Cl.
CPC ............ *C01B 3/48* (2013.01); *C01B 3/501* (2013.01); *C01B 3/506* (2013.01); *C10G 25/003* (2013.01); *C10G 45/02* (2013.01); *C10G 49/007* (2013.01); *H01M 8/0618* (2013.01); *H01M 8/0675* (2013.01); *H01M 8/0687* (2013.01); *B01J 2208/00504* (2013.01); *C01B 2203/0233* (2013.01); *C01B 2203/0405* (2013.01); *C01B 2203/065* (2013.01); *C01B 2203/066* (2013.01); *C01B 2203/0811* (2013.01); *C01B 2203/0822* (2013.01); *C01B 2203/0827* (2013.01); *C01B 2203/127* (2013.01); *C10G 2300/104* (2013.01); *C10G 2300/1044* (2013.01); *C10G 2300/1051* (2013.01); *C10G 2300/1055* (2013.01); *C10G 2300/202* (2013.01); *C10G 2300/207* (2013.01); *C10G 2400/02* (2013.01); *C10G 2400/04* (2013.01); *C10G 2400/08* (2013.01)

(56) References Cited

U.S. PATENT DOCUMENTS

| | | | |
|---|---|---|---|
| 3,660,276 A | 5/1972 | Lacey | |
| 4,098,960 A * | 7/1978 | Gagnon | H01M 8/0612 |
| | | | 429/444 |
| 4,545,976 A * | 10/1985 | Osman | C01B 3/382 |
| | | | 252/373 |
| 5,130,115 A | 7/1992 | Fujisou | |
| 5,149,600 A | 9/1992 | Yamase | |
| 5,335,628 A * | 8/1994 | Dunbar | H01M 8/04029 |
| | | | 122/412 |
| 6,348,278 B1 | 2/2002 | Lapierre | |
| 10,941,359 B2 * | 3/2021 | George, II | H01M 8/0675 |
| 2002/0071976 A1 * | 6/2002 | Edlund | B01J 20/0237 |
| | | | 422/600 |
| 2003/0064259 A1 | 4/2003 | Gittleman | |
| 2009/0035622 A1 | 2/2009 | King et al. | |
| 2009/0232729 A1 * | 9/2009 | Genkin | C01B 3/384 |
| | | | 60/775 |
| 2010/0263185 A1 | 10/2010 | Lewis | |

* cited by examiner

FUEL PROCESSING SYSTEM AND METHOD FOR SULFUR BEARING FUELS

CROSS-REFERENCE TO RELATED APPLICATIONS

This application is a continuation of U.S. Ser. No. 16/284,077 filed Feb. 25, 2019, which is a continuation of U.S. Ser. No. 13/272,865 filed Oct. 13, 2011, which claims the benefit of U.S. provisional application Ser. No. 61/392,698, filed Oct. 13, 2010, which is incorporated by reference herein.

BACKGROUND OF THE INVENTION

In the field of hydrocarbon fuel processing, a need exists for efficient ways to reduce organic sulfur components. Current technologies for removing sulfur from liquid hydrocarbon feedstocks can include hydrodesulfurization (HDS). In HDS, the organic sulfur in the fuel is catalytically converted to H2S. Such a conversion typically occurs under high hydrogen pressures.

One example of the need for new desulfurization approaches involves power generation. One promising technology is fuels cells, which can provide a silent source of power having a low heat signature. However, fuel cells require hydrogen as fuel. Short of providing stored hydrogen gas, the primary means of supplying hydrogen is by reforming a hydrocarbon fuel. One major barrier to hydrocarbon reformation can be the presence of significant organic sulfur impurities, which can poison the catalysts in the reformer and the electrode catalysts in the fuel cell.

There is a need for an improved fuel processor system and method for sulfur bearing fuels.

SUMMARY OF THE INVENTION

A fuel processing system for a sulfur bearing fuel comprises a hydrodesulfurization reactor followed by an adsorbent bed for removing sulfur or sulfur containing species from the fuel. In certain embodiments, the adsorbent bed is a ZnO bed.

A method for processing a sulfur bearing fuel comprises directing the fuel to a hydrodesulfurization reactor, then directing the fuel to an adsorbent bed for removing sulfur or sulfur containing species.

In another embodiment, a fuel processing system for a sulfur bearing fuel comprises a steam reformer, a hydrodesulfurization reactor, and an adsorbent bed for removing sulfur or sulfur containing species.

A method for processing a sulfur bearing fuel comprises directing the fuel through a steam reformer, a hydrodesulfurization reactor, and an adsorbent bed for removing sulfur or sulfur containing species.

Various aspects of this invention will become apparent to those skilled in the art from the following detailed description of the preferred embodiments, when read in light of the accompanying drawings.

BRIEF DESCRIPTION OF THE DRAWINGS

FIGS. 1A, 1B, 1C, and 1D are collectively designated as FIG. 1.

DETAILED DESCRIPTION OF THE PREFERRED EMBODIMENT

Figure 1A:
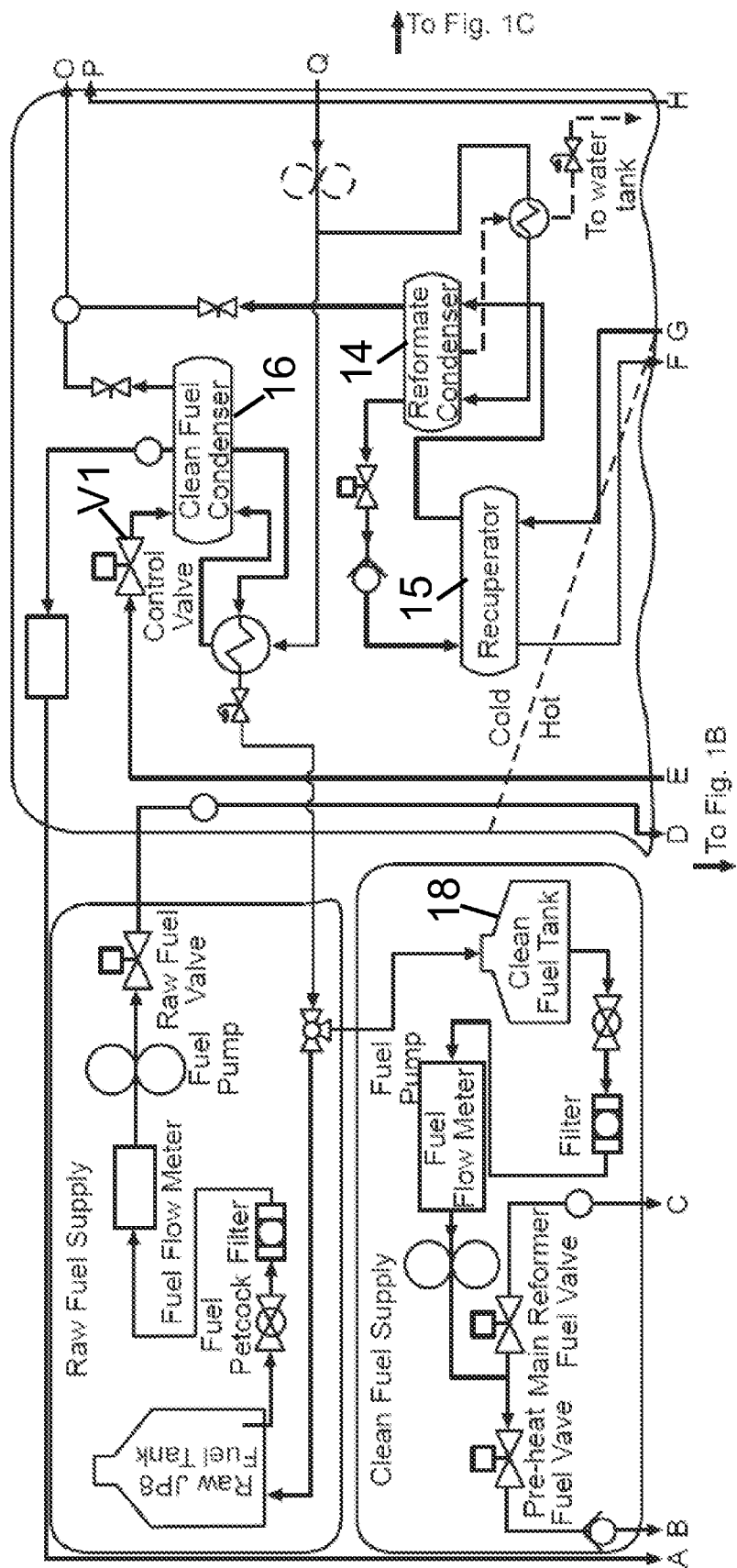
FIGS. 1A, 1B, 1C, and 1D is an overall system schematic of a fuel processing system according to the invention.

The present invention relates to an improved fuel processing system and method for sulfur bearing fuels. Certain aspects of the system and method are described generally hereinbelow, followed by a more detailed description with reference to the drawings.

The fuel processing system and method can be used with any sulfur bearing fuels. In certain embodiments, the sulfur bearing fuel is JP8, Jet-A, Jet-A1 JP5, navy fuels and heavy distillates, diesel, kerosene, gasoline, other fossil or biologically based fuel, other commodity fuel, other military or commercial sulfur bearing fuel, or any combination of different sulfur bearing fuels.

The fuel processing system and method include a hydrodesulfurization (HDS) reactor. Any suitable hydrodesulfurization reactor can be used. In certain embodiments, the HDS reactor is operated at a temperature between about 280° C. and about 450° C., and in some embodiments at a temperature between about 360° C. and about 390° C. The HDS reactor can operate by any suitable hydrodesulfurization process. In certain embodiments, the HDS reactor is a catalytic reactor which may include a trickle bed over a catalyst. For example, the catalyst used in the HDS reactor can be a nickel-molybdenum or a cobalt-molybdenum catalyst or any other type of catalyst suitable for a catalytic desulfurization process.

Following the HDS reactor, the fuel processing system and method also include an adsorbent bed for removing sulfur or sulfur containing species from the fuel. In certain embodiments, the adsorbent bed is positioned immediately downstream of the hydrodesulfurization reactor. The operating temperature of the adsorbent bed may be similar to the operating temperature of the HDS reactor to enable proximity and juxtaposition. For example, in some embodiments the operating temperature of the adsorbent bed is within about 40° C. of the operating temperature of the HDS reactor.

Any suitable adsorbent bed can be used. In certain embodiments, the adsorbent bed adsorbs the sulfur or sulfur containing species from the fuel by a chemical reaction (a chemisorbent bed). For example, in some embodiments the adsorbent bed is a zinc oxide (ZnO) bed. A preferred zinc oxide bed can adsorb at least about 20% of bed weight as sulfur before requiring regeneration or replacement. In some embodiments the zinc oxide bed can be regenerated in place in the processing system. The zinc oxide bed can have any suitable structure. For example, in certain embodiments the zinc oxide bed include a main bed followed by a guard bed, with a sulfur sensor between the main and guard beds to notify the user to change the main bed.

In another embodiment, the fuel processing system and method include a steam reformer, a hydrodesulfurization reactor, and an adsorbent bed for removing sulfur or sulfur containing species. In certain embodiments, the fuel is vaporized prior to the HDS reactor.

Any suitable steam reformer can be used. In certain embodiments, reformate is directed from the reformer to the HDS reactor and provides hydrogen to desulfurize the fuel. In some embodiments, the reformate is extracted prior to a water gas shift reactor before directing the reformate to the HDS reactor. In other embodiments, the reformate is extracted immediately following a water gas shift reactor before directing the reformate to the HDS reactor.

In another aspect, the fuel processing system and method may also include cooling the reformate to condense a portion of the water out of the reformate stream before directing the reformate to the HDS reactor. For example, the reformate after condensation may contain less than about 20% water, or less than about 10% water, or less than about 5% water. Any suitable condensing apparatus and conditions can be used. In some embodiments, the reformate is reheated by exchange with reformate prior to condensing the reformate.

In a further aspect, the gaseous mixture leaving the HDS reactor (e.g., a mixture of gaseous fuel, reformate and scrap gas) may be directed immediately to an adsorbent bed (for example, a ZnO bed) for removal of $H_2S$ or other sulfur containing species. In certain embodiments, the gaseous mixture is directed to a condenser upon leaving the adsorbent bed. Any suitable condensing apparatus and conditions can be used. For example, in certain embodiments the condenser is operated at a temperature between about 15° C. and about 120° C., and more particularly between about 35° C. and about 70° C.

The fuel processor system configuration is described in detail hereinbelow and shown in the figures. Certain features of the system can be summarized as follows. The features can be practiced independently to improve the system, or they can be practiced together in any combinations for an improved system.

One feature is the use of reformate to do hydrodesulfurization. Another feature is the position of the zinc oxide bed, or other type of adsorbent bed, immediately downstream of the HDS reactor. The use of a specific hydrodesulfurization technology followed by a hydrogen-sulfide sorbent bed can limit sulfur transport to downstream areas of the system. Another feature is the condensation of water from the reformate before it goes to the HDS reactor. Still another feature is the condensation of the fuel after the zinc oxide bed, or other adsorbent bed, at an elevated temperature. The condensation at the two locations can beneficially control water management and assist in desulfurization. In some embodiments, one or both of the condensations are conducted above room temperature. Several of these described features are shown in FIG. 3. In particular, FIG. 3 shows a ZnO bed 10 immediately following HDS reactors 12, a reformate condenser 14, a recuperator 15, and a clean fuel condenser 16, which have been summarized above and which are described in more detail below. FIG. 3 shows other components including a clean fuel tank 18, a water-gas shift reactor 20, a membrane separator 22, and interconnections between the various components 10, 12, 14, 15, 16, 18, 20, 22. A control valve V1 controls a connection from the ZnO reactor 10 to the clean fuel condenser 16 (also shown in FIG. 1A). A control valve V2 controls a connection from the membrane separator 22 to the reformer combuster 60 (shown in FIG. 1B and FIG. 2).

FIG. 1 (commonly designating FIGS. 1A, 1B, 1C, and 1D) is an overall system schematic of a fuel processing system that includes fuel reforming and fuel cleaning to allow operation on conventional military JP8 and similar military and commercial fuels, primarily kerosene and diesel type fuels. FIG. 1 shows the main hardware components and their grouping into functional subsystems. Specific subsystems are delineated by the outlines in FIG. 1; each of the subsystems will have an individual electronic control unit (ECU) which monitors and controls the function of that subsystem in response to input from the other subsystem ECUs. The fuel processor ECU serves as the master controller. The cooling system 24 is bounded by a dotted line because there are cooling elements embedded in many of the other subsystems.

Figure 1B:
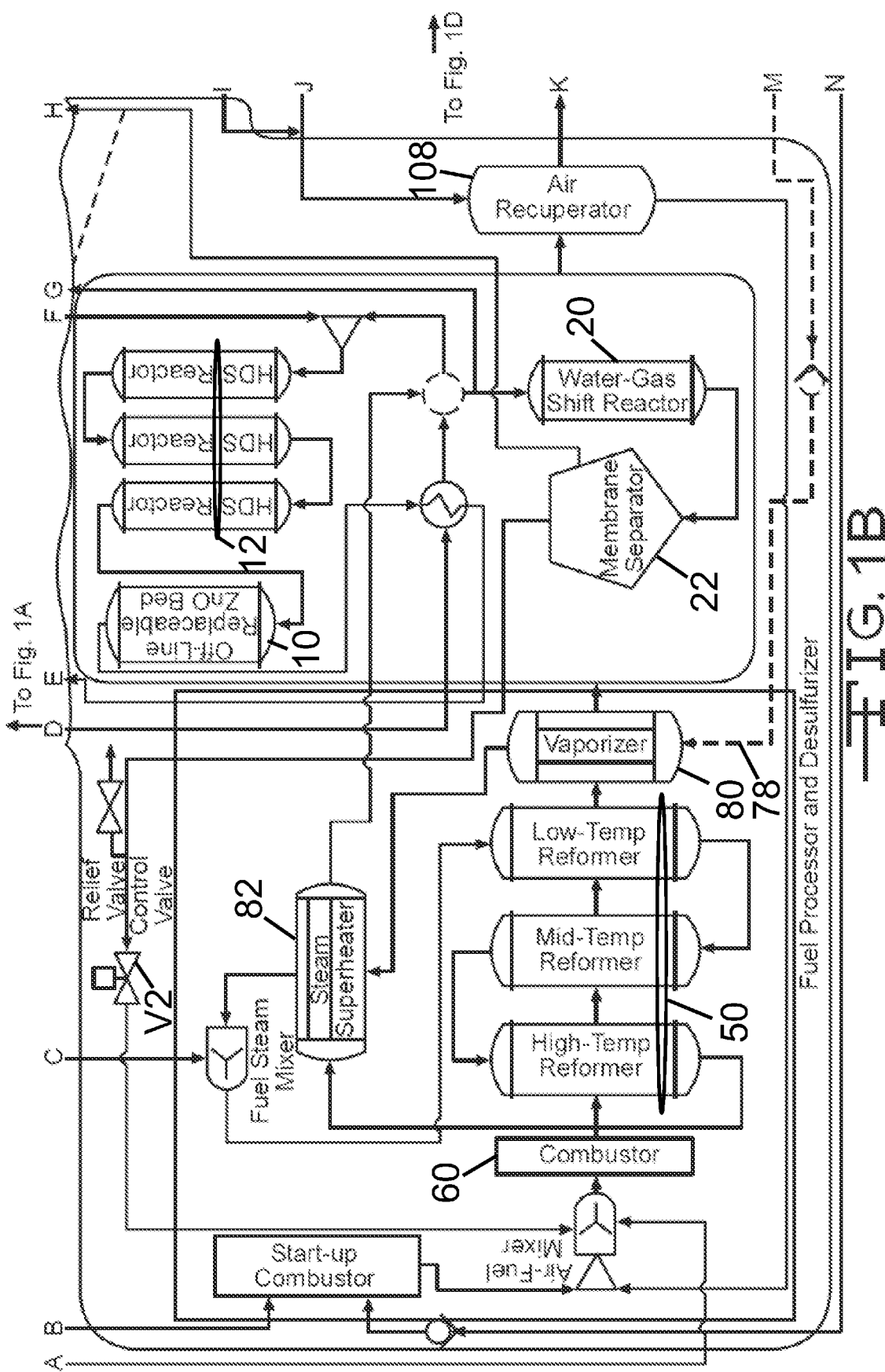
Figure 1C:
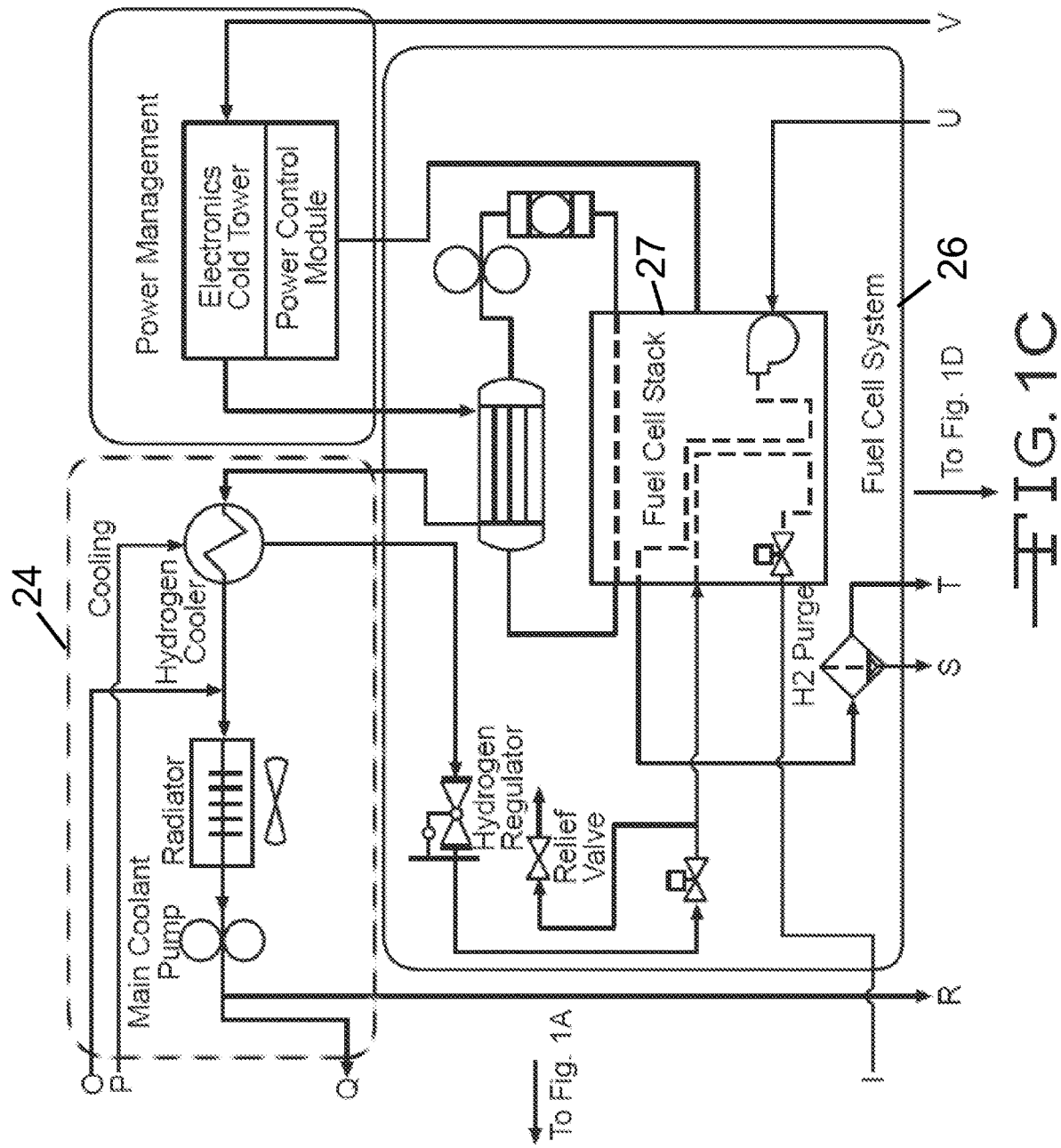
Figure 1D:
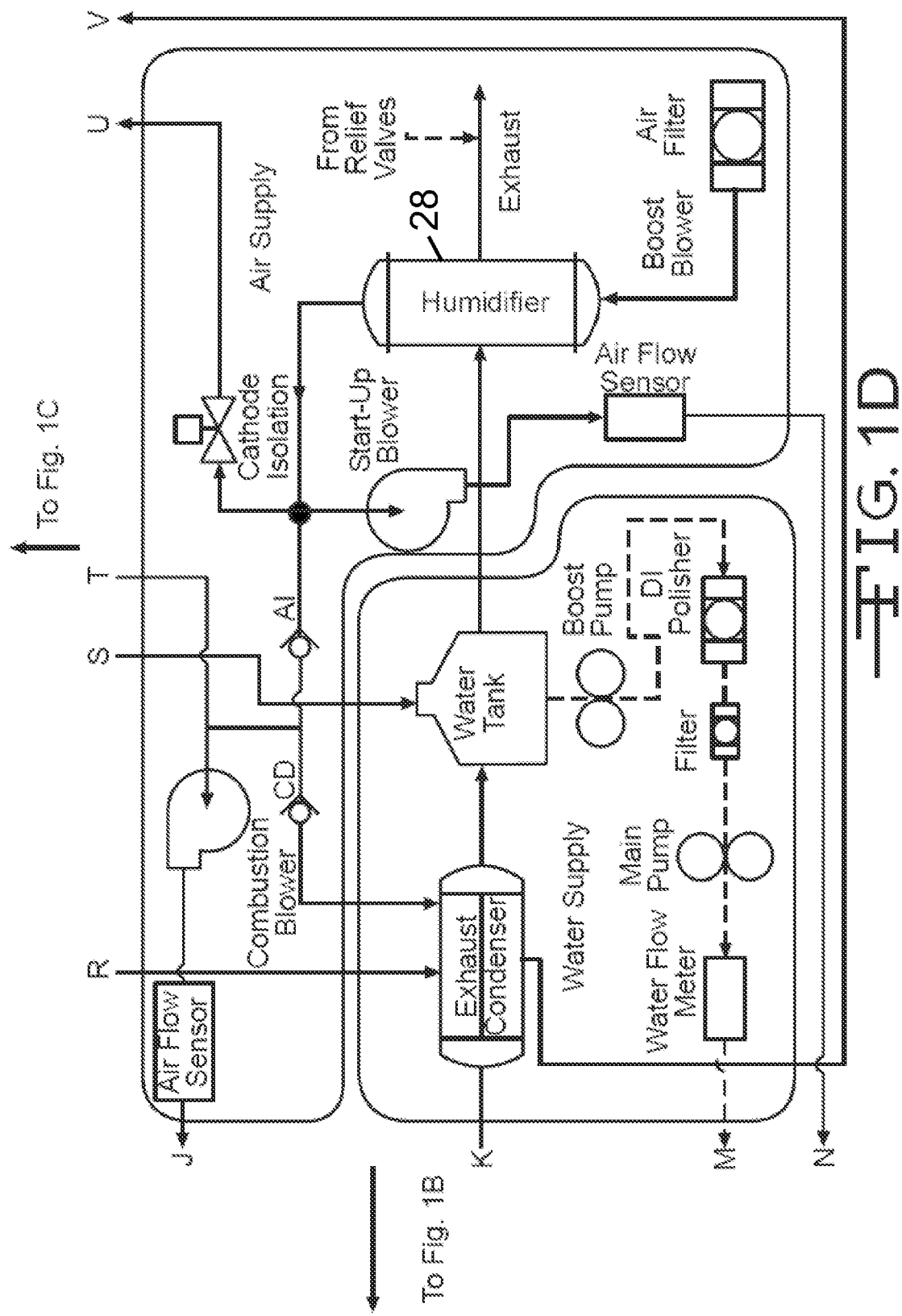

FIG. 1 shows the power electronics and fuel cell system 26 (with a fuel cell stack 27 as shown in FIG. 1C) and their location and interaction with the remainder of the system. Note in particular the use of cathode exit air as combustion supply air and the existence of the humidifier 28 on the combustion exhaust. These two features contribute to achieving overall water balance at high ambient temperature and are included in a related patent application, U.S. patent application Ser. No. 11/595,203, which is incorporated by reference herein. Also see U.S. patent application Ser. No. 12/182,640, filed Jul. 30, 2008, which was published as 2009/0035622 A1 on Feb. 5, 2009, and which is incorporated by reference herein.

Certain features of the fuel processing system may include one or more of the following:

Condensation of water from the reformate supplied to the HDS desulfurization system. Higher temperature condensation at this location to manage, rather than minimize, water going to the HDS system.

Condensation of fuel after pressure reduction and at high temperature. Higher temperature condensation to minimize H2S sorption.

Adsorption of H2S at the exit of the HDS system to eliminate need for special handling of downstream flows and potential for cold-end condensation.

These features combined or separately may provide benefits to system operational simplicity and efficiency. The benefits may include:

Elimination of a fuel/water separation step after the clean fuel condenser 16.

Elimination of a water clean-up step to remove dissolved H2S.

Partially decoupling the primary reformer from the HDS fuel cleaning system. The primary reformer operates best and most reliably with steam to carbon ratios that are relatively high resulting in water content of 30 to 50% in the reformate. The HDS beneficially operates with lower water content, possibly below 10%, though the optimum water content has not yet been determined. By incorporating the condenser and recuperator, the primary reformer can be operated at its preferred conditions while the HDS system is operated at its preferred condition.

The zinc-oxide bed sulfur trap shown in FIG. 1B at the exit of the HDS reactors 12 may eliminate the need for further special handling of the reformate and fuel stream downstream of the bed. The zinc oxide bed 10 may provide a number of system benefits:

Eliminates dissolved $H_2S$ in the condensed fuel which otherwise must be stripped before the fuel is placed in the clean fuel tank 18.

Eliminates sulfur in the reformate off-gas from the HDS system which can result in cold-end component corrosion after combustion to $SO_2$.

Eliminates any special handling of sulfur laden streams, including the use of auxiliary burners for the sulfur containing streams where burner misfire or failure could result in the release of H2S.

Estimates of the bed capacity, based on a bed size about ⅓ of the HDS bed size are between 360 and 900 hours on 500 ppm JP8—depending on the load profile, fuel sulfur content, and effective capacity of the ZnO bed 10. Greater than 600 hours at published sorption rates and nominal average load (60% of peak load) is a reasonable expectation. Bed exchange timing is therefore greater than the usual time between oil changes for competitive engine generators.

It may be possible to regenerate the zinc-oxide bed 10 in place if it is found to be necessary in a product system to achieve sufficient run time between maintenance. Regeneration can be accomplished with an air purge at operating temperature and results in production of $SO_2$ as an effluent, not $H_2S$. The number of practical regeneration cycles can be determined.

It was discovered that excess water in the reformate reaching the HDS system can be detrimental to HDS performance. Operation with steam to carbon ratios greater than the conditions needed for the HDS system reformate inlet are desirable for carbon deposition management. Hence, a condenser 14 has been inserted on the reformate stream just prior to the HDS system. The condenser is intended to reduce water content to less than 10% for the reformate reaching the HDS system. Water content greater than 30% is typical in steam reforming reformate and affects both carbon management and system temperature control. The condenser therefore decouples the base reformer system from the HDS system water requirements to provide significant additional operational flexibility. The reformate can be recuperatively reheated prior to introduction to the HDS system. The condensed water from the reformate condenser 14 can be routed to the water tank for re-use in the reforming system.

In certain embodiments, the clean fuel condenser 16 is operated at about 40° C. or greater (for example, about 60° C.). This minimizes the water which condenses with the fuel (it also reduces H2S sorption if the ZnO bed is not used or if the bed is saturated and not changed out when required). The pre-HDS condenser 14 lowers the water content of the reformate reaching the HDS system and subsequent clean fuel condenser 16. Operating the clean fuel condenser 16 at temperatures above about 40° C. may substantially eliminate water condensed with the fuel.

Fuel Processor and Desulfurizer—The following description provides additional information and explanation of system operation. It also discloses a specific configuration of the fuel processor.

Figure 2:
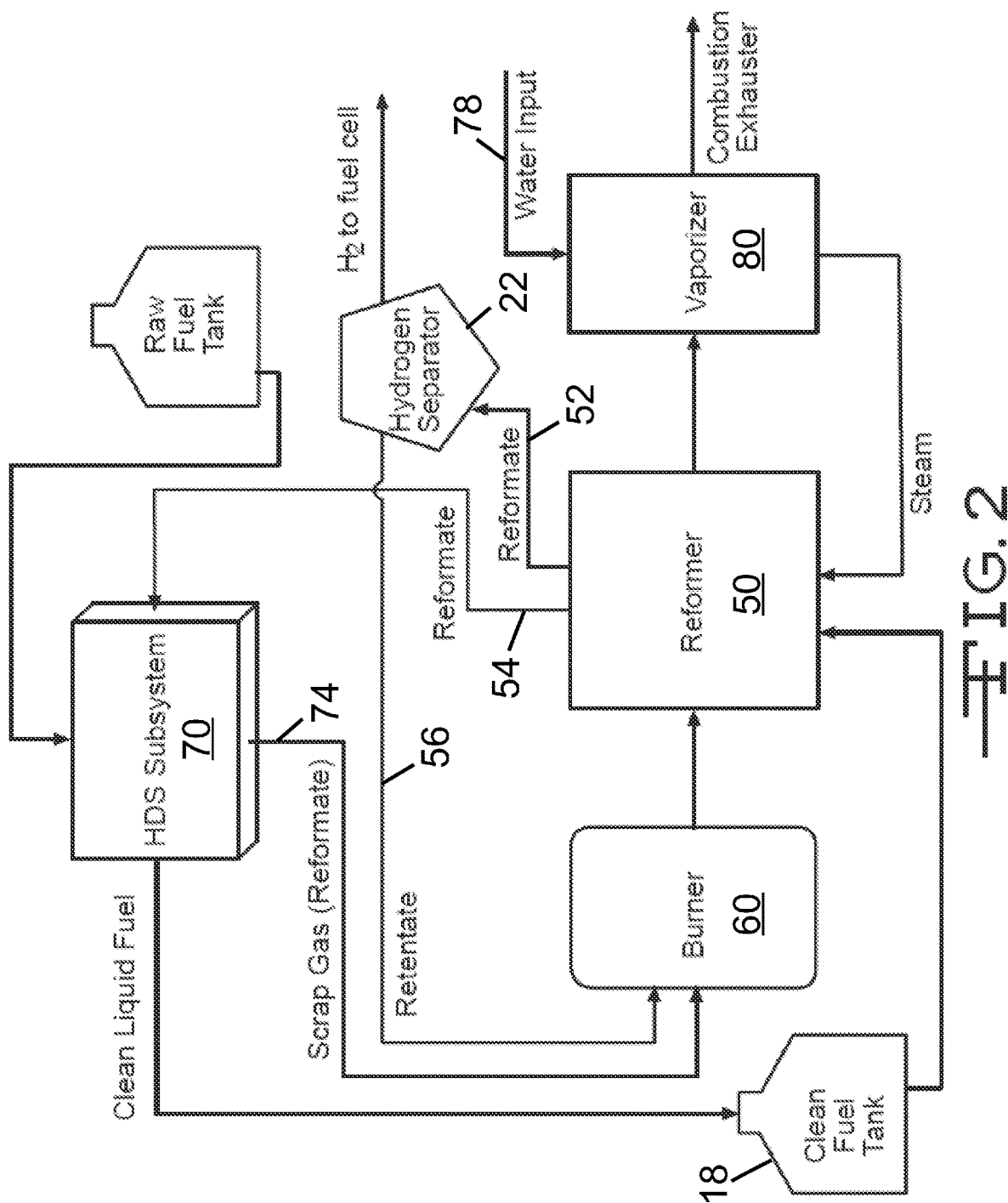
FIG. 2 is a block diagram of some components of a fuel processing system according to the invention.
Figure 3:
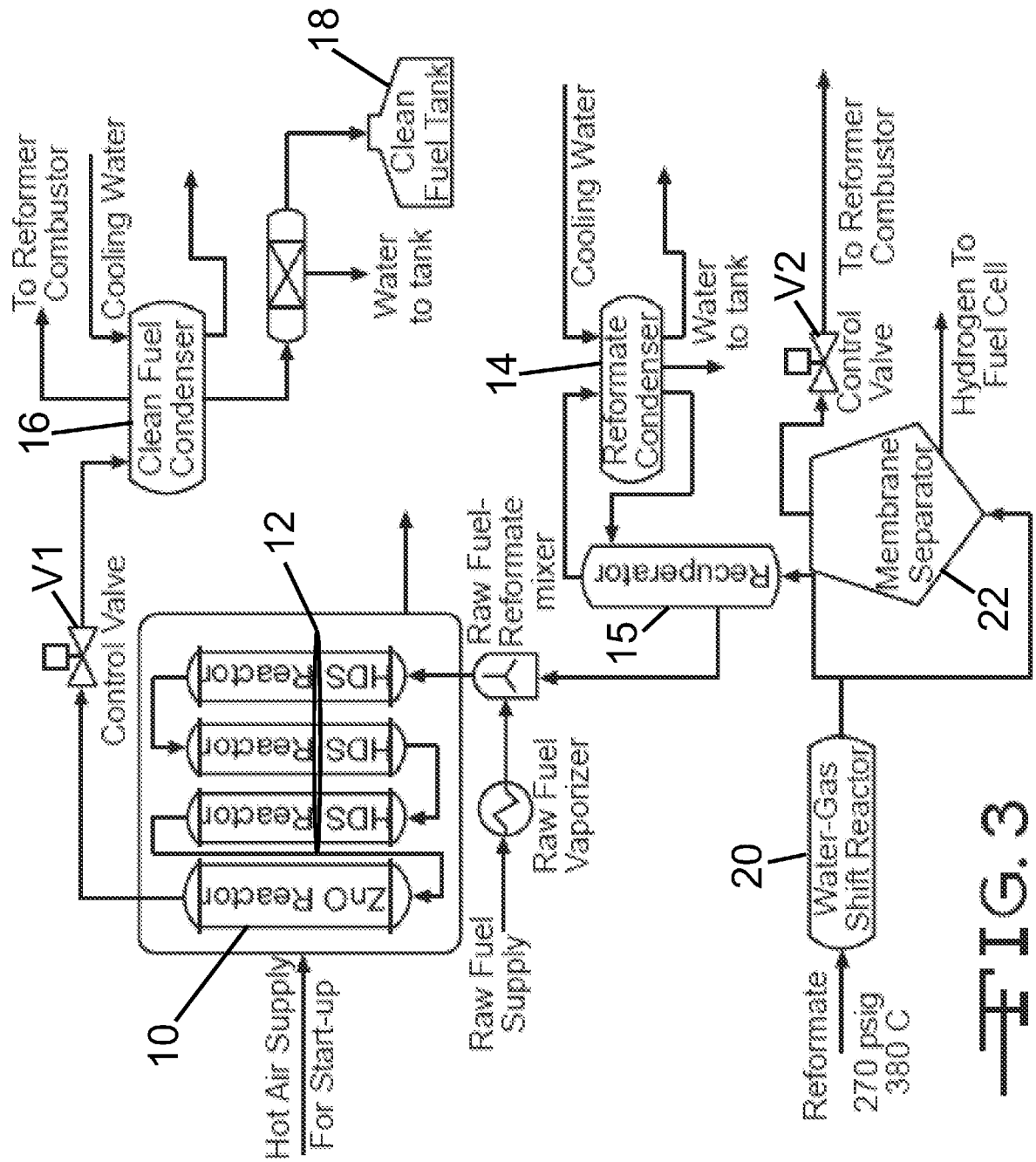
FIG. 3 is a schematic showing certain features of a fuel processing system according to the invention.

FIG. 2 is a block diagram of the reformer and desulfurizer system simplified to allow initial focus on the primary functions of each subsystem within the overall fuel processor and desulfurizer system. The primary function of the reformer 50 (which may include more than one reforming reactor, see FIG. 1B) is to react steam and clean fuel to form a hydrogen rich reformate stream. The reformate will include $H_2$, $H_2O$, $CO_2$, CO, and $CH_4$. Hydrogen and water are the dominant species representing 70% to 80% of the stream. As shown on the block diagram, two streams 52, 54 leave the reformer 50. The primary stream 52 feeds the membrane separator 22 where most of the hydrogen (~85%) is separated and sent to the PEM fuel cell. The residual reformate retained by the separator (retentate) is routed to the burner 60. The secondary stream 54 provides reformate to the HDS system 70 where the hydrogen in the reformate 54 will react with sulfur bearing hydrocarbons in the raw fuel to form hydrogen sulfide (H2S). The primary functions of the HDS system 70 are to facilitate the conversion of organic sulfur to H2S and output a stream of clean liquid fuel. A secondary output of the HDS system is residual reformate (scrap gas) 74 that includes the unreacted species in the original reformate (CO, CO2, CH4, H2) plus some other light hydrocarbon compounds that may remain from the HDS process. This stream 74 is combined with the retentate 56 from the membrane separator 22 and routed to the burner 60. The retentate 56 and scrap gas 74 are burned to provide the heat required for the steam reforming reaction and to vaporize water (FIG. 2 shows vaporizer 80 receiving water input 78; see also FIG. 1B) for the reforming reaction.

FIG. 2 partially illustrates an aspect of the system design: the energy content of the retentate plus scrap gas is balanced with the heat needed for the reforming process. This balance is affected by the typical operating conditions for the reformer (e.g., 270 psig and 750° C.) and combustor temperature (e.g., about 1050° C.). Previous APG systems operating on clean fuel have not included the scrap gas return stream and have generally been balanced through a combination of matching fuel flow to hydrogen flow to the fuel cell and through increased air flow and increased water flow to manage system temperatures if membrane separator capacity limits the ability to match main fuel flow and fuel cell requirements. Once the controls were appropriately tuned, the system worked satisfactorily. With the scrap gas quantity being primarily dictated by the requirements in the HDS system rather than the main reformer, additional control complexity may be expected, particularly for transient behavior. System balance is possible with reasonable expectations for membrane and HDS subsystem performance. Use of vitiated combustion air from the cathode exit is helpful in controlling combustor temperature.

Each of the blocks shown in FIG. 2 may be decomposed into other smaller features/components. For the proposed FPD design, the items within the box in FIG. 1 are a subassembly called the main reactor assembly. The items within the other box in the figure are the clean-up subassembly, the upper section as shown in FIG. 1 for the raw fuel and the lower section for purifying the hydrogen prior to the fuel cell. These items may reside within the flue gas duct between the main reactor assembly and the air recuperator 108 (see FIG. 1B). The three subassemblies can be housed in a single hot-box with external insulation.

The operation of the fuel processor and HDS system 70 is best understood with reference to FIG. 1. In a particular example, the desulfurization system operates at about 270 psig and roughly 380° C. Raw fuel (upper left corner, FIG. 1A) is pumped and measured then sent to the two heat exchangers within the hot-box to preheat and vaporize before being introduced to the HDS reactors 12 along with reformate from the main fuel processor. The reformate is extracted from the main reformate line before the shift reactor 20 and passes through a recuperative cooler and high-temperature condenser (~405° C.) to remove approximately 85% of the water before being reheated and mixed with the raw fuel. Removing water prior to the HDS system increases the partial pressure of hydrogen in the reformate to improve reaction conditions in the HDS system. The condenser also decouples the main fuel processor steam-to-carbon ratio from the HDS system which allows the main fuel processor to run at high steam to carbon ratio, particularly during transients, without impacting HDS performance.

As the raw fuel/reformate mixture passes through the HDS catalyst beds the organic sulfur compounds are preferentially reacted to form H2S, consuming some of the hydrogen in the reformate stream. In the sulfur stripping process the parent molecule may be cleaved producing two lower molecular weight hydrocarbon molecules. However, the current HDS system introduces very little overall change in fuel boiling point after the HDS reaction. As the cleaned fuel, residual reformate, and H2S exit the HDS reactors 12 the stream enters a zinc oxide bed 10. The ZnO bed 10 preferentially adsorbs the H2S through the reaction:

ZnO+H2S->ZnS+H2O

The reaction is reversible and sensitive to the presence of water in the stream, hence, the pre-HDS reformate condenser 14 is useful in improving ZnO bed utilization. Zinc oxide beds typically adsorb between 20% and 30% of bed weight as sulfur before requiring regeneration or replacement. FIG. 1B shows a single ZnO bed 10, which is presumed to be a replaceable item. Initial calculations suggest that a reasonable size bed (equivalent to one of the HDS beds) will provide a run time between replacements of between 72 and 900 hours depending on the sulfur content of the fuel, average load, and bed utilization. The 72 hour number is based on continuous running at full load on 2500 ppm sulfur fuel with only 20% bed utilization—an unlikely scenario. 900 hours results from 60% average load and 500 ppm JP8 with 30% bed utilization. Run times before bed replacement of over 1000 hours are plausible with current domestic JP8, which seldom exceeds 400 ppm. Design of the ZnO bed 10 for easy replacement is complicated by the operating pressure and temperature. However, the ZnO material is in a relatively small pellet form. We believe the pellets can be removed and replaced through ports without removing the entire pressure vessel.

As the fuel/reformate stream leaves the ZnO bed 10 it recuperatively provides some heat to the incoming fuel and then passes through a control valve V1 where the pressure is reduced to approximately 5 psig. A condenser then removes the fuel from the stream. The clean fuel condenser 16 operates at 60 C to condense all but the lightest 2% of the fuel and virtually none of the water that remains in the reformate stream. The fuel is further cooled to room temperature and then routed to the clean fuel tank 18 for future use in the main fuel processor. The residual that does not condense is routed to the main burner.

In certain embodiments, the dual high-temperature condenser, ZnO bed configuration offers significant system simplification. Without the pre-HDS condenser the steam reformer 50 is constrained to operate at low steam-to-carbon ratios where carbon deposition in the reactors is more likely. A high temperature condenser is used to retain some water in the reformate to counteract the potential for carbon formation in the HDS system, discourage reverse shift and minimize the heat duty of the reformate recuperator 15. If the H2S is not removed before the clean fuel condenser, significant H2S will be absorbed in the fuel as it condenses. The absorbed H2S requires downstream stripping to avoid sulfur contamination of the fuel processor. The residual H2S would be routed to the main burner where it would be converted to SO2 during the combustion process. This is likewise undesirable because SO2 readily absorbs into water as it is condensed, thus contaminating the reactant water supply. SO2 also reacts to form H2SO3 and H2SO4 downstream of the combustor. These sulfur acids have high dew points and can cause significant cold end corrosion problems.

In certain embodiments, the main fuel reformer uses microtechnology reactors to achieve high processing rates, excellent conversion, small size, and low system pressure drop. As shown in FIG. 1 (specifically FIG. 1B), the entering water 78 is vaporized and superheated prior to being mixed with the clean fuel. The clean fuel is vaporized by the sensible heat of the steam prior to entering the low temperature reforming pass. Initial reforming occurs at relatively low temperature to discourage fuel cracking until significant hydrogen has been created. As the steam-fuel mixture moves forward in the reactor train it is re-mixed between reactor passes to average out any variation in reaction rate within a reactor panel. There are also intermediate mixing features within each reactor pass that partially mix the reactant stream to address any low performing channels. As the reformate exits the reforming panels it passes through the steam super heater 82 to reduce its temperature before reaching the secondary raw fuel vaporizer and subsequently the shift reactor 20. The HDS portion is extracted prior to the shift reactor 20. The main reformate stream 52 is directed to the membrane separator 22 where most of the hydrogen is separated and sent to the fuel cell. The retentate 56 is mixed with the scrap gas from the HDS system and burned to provide heat to the reformer panels. Downstream of the vaporizer and clean-up duct, the combustion gases pass through the air recuperator 108 to redirect as much of the exhaust heat as possible back into the system.

The principle and mode of operation of this invention have been explained and illustrated in particular embodiments. However, it must be understood that this invention may be practiced otherwise than as specifically explained and illustrated without departing from its spirit or scope.

The invention claimed is:

1. A fuel processing system for a sulfur bearing fuel, the fuel processing system comprising:
    one or more hydrodesulfurization reactors each comprising a catalyst bed operative to catalyze organic sulfur compounds in sulfur bearing fuel to form a gaseous mixture of fuel and sulfur or a sulfur containing species;
    an adsorbent bed connected to receive the gaseous mixture of the fuel and the sulfur or sulfur containing species and to remove the sulfur or sulfur containing species from the gaseous mixture by adsorbing the sulfur or sulfur containing species;
    a clean fuel condenser connected to condense the gaseous mixture into clean fuel after removal of the sulfur or sulfur containing species by the adsorbent bed;
    a steam reformer configured to combine the clean fuel with steam to generate at least one reformate stream; and
    a steam superheater configured to receive vaporized water and the at least one reformate stream from the steam reformer, and which reduces the temperature of the at least one reformate stream and superheats the vaporized water to form the steam that is combined with the clean fuel;
    wherein the at least one reformate stream exiting the steam superheater includes a first reformate stream that feeds a water gas shift reactor, and a second reformate stream that feeds a recuperator; and
    further comprising a reformate condenser connected to the recuperator and configured to remove water from the second reformate stream received from the recuperator, wherein the second reformate stream is then supplied to at least one of the one or more hydrodesulfurization reactors.

2. The fuel processing system of claim 1 wherein the catalyst bed of each hydrodesulfurization reactor comprises a nickel molybdenum catalyst.

3. The fuel processing system of claim 1 wherein the adsorbent bed is a zinc oxide bed.

4. The fuel processing system of claim 1 wherein the adsorbent bed is positioned immediately downstream of the one or more hydrodesulfurization reactors in the fuel processing system.

5. The fuel processing system of claim 4 further comprising:
an electronic control unit (ECU) monitoring and controlling the fuel processing system to control an operating temperature of the adsorbent bed to within about 40° C. of an operating temperature of the one or more hydrodesulfurization reactors.

6. The fuel processing system of claim 1 further comprising:
a pressure-reducing control valve that controls a connection from the adsorbent bed to the clean fuel condenser.

7. The fuel processing system of claim 6 further comprising:
an electronic control unit (ECU) monitoring and controlling the fuel processing system to control the pressure-reducing control valve to reduce the pressure to about 5 psig.

8. The fuel processing system of claim 1 further comprising:
a membrane separator downstream of the water gas shift reactor which subsequently receives the first reformate stream, the membrane separator operative to separate hydrogen from the first reformate stream.

9. The fuel processing system of claim 8 further comprising:
a fuel cell system comprising a fuel cell stack connected to receive the hydrogen separated from the first reformate stream by the membrane separator.

10. The fuel processing system of claim 1, wherein the recuperator cools the second reformate stream received from the steam superheater and heats the second reformate stream received from the reformate condenser, which is then supplied to at least one of the one or more hydrodesulfurization reactors.

11. A fuel processing method for processing a sulfur bearing fuel, the fuel processing method comprising:
using one or more hydrodesulfurization reactors each comprising a catalyst bed, catalyzing organic sulfur compounds in sulfur bearing fuel to form a gaseous mixture of fuel and sulfur or a sulfur containing species;
using an adsorbent bed connected to receive the gaseous mixture of the fuel and the sulfur or sulfur containing species and to remove the sulfur or sulfur containing species from the gaseous mixture by adsorbing the sulfur or sulfur containing species;
using a clean fuel condenser, condensing the gaseous mixture into clean fuel after removal of the sulfur or sulfur containing species by the adsorbent bed;
using a steam reformer, combining the clean fuel with steam to generate at least one reformate stream;
passing the at least one reformate stream through a steam superheater to reduce the temperature of the at least one reformate stream and to superheat vaporized water to form the steam that is combined with the clean fuel;
wherein the at least one reformate stream exiting the steam superheater includes a first reformate stream that feeds a water gas shift reactor, and a second reformate stream that feeds a recuperator; and
cooling the second reformate stream in the recuperator, passing the second reformate steam through a reformate condenser, reheating the second reformate stream in the recuperator, and then supplying the second reformate stream to at least one of the one or more hydrodesulfurization reactors,
wherein the adsorbent bed includes a main bed followed by a guard bed, and the fuel processing method further comprises:
using a sulfur sensor between the main bed and the guard bed, providing a notification to change the main bed.

12. The fuel processing method of claim 11 further comprising:
controlling an operating temperature of the adsorbent bed to within about 40° C. of an operating temperature of the one or more hydrodesulfurization reactors.

13. The fuel processing method of claim 11 further comprising:
using a pressure-reducing control valve, controlling a connection from the adsorbent bed to the clean fuel condenser to reduce the pressure to about 5 psig.

14. The fuel processing method of claim 11 further comprising:
using a membrane separator to separate hydrogen from the first reformate stream downstream from the water gas shift reactor.

15. A fuel processing method for processing a sulfur bearing fuel, the fuel processing method comprising:
using one or more hydrodesulfurization reactors each comprising a catalyst bed, catalyzing organic sulfur compounds in sulfur bearing fuel to form a gaseous mixture of fuel and sulfur or a sulfur containing species;
using an adsorbent bed connected to receive the gaseous mixture of the fuel and the sulfur or sulfur containing species and to remove the sulfur or sulfur containing species from the gaseous mixture by adsorbing the sulfur or sulfur containing species;
using a clean fuel condenser, condensing the gaseous mixture into clean fuel after removal of the sulfur or sulfur containing species by the adsorbent bed; and
using a steam reformer, combining the clean fuel with steam to generate at least one reformate stream; and
passing the at least one reformate stream through a steam superheater to reduce the temperature of the at least one reformate stream and to superheat vaporized water to form the steam that is combined with the clean fuel;
wherein the at least one reformate stream exiting the steam superheater includes a first reformate stream that feeds a water gas shift reactor, and a second reformate stream that feeds a recuperator; and
cooling the second reformate stream in the recuperator, passing the second reformate steam through a reformate condenser, reheating the second reformate stream in the recuperator, and then supplying the second reformate stream to at least one of the one or more hydrodesulfurization reactors.

16. The fuel processing method of claim 15 further comprising:
controlling an operating temperature of the adsorbent bed to within about 40° C. of an operating temperature of the one or more hydrodesulfurization reactors.

17. The fuel processing method of claim 15 further comprising:
using a pressure-reducing control valve, controlling a connection from the adsorbent bed to the clean fuel condenser to reduce the pressure to about 5 psig.

18. The fuel processing method of claim 15 further comprising:
using a membrane separator to separate hydrogen from the first reformate stream downstream of the water gas shift reactor.

* * * * *